Figure 1:
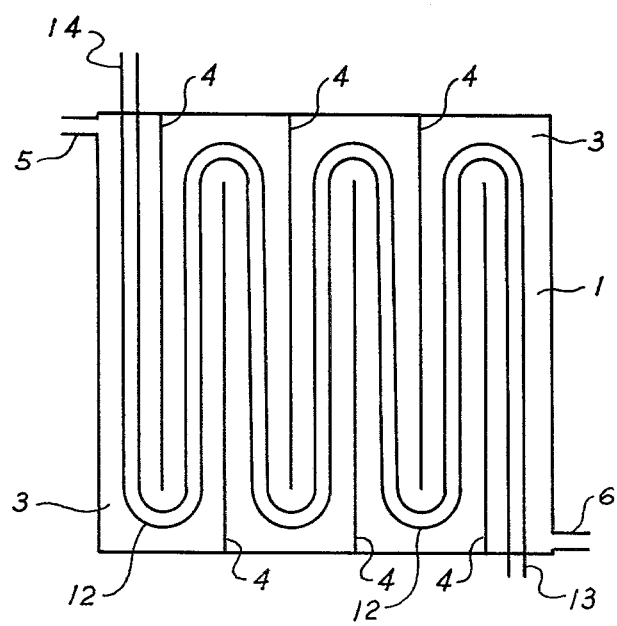

United States Patent Office 3,219,549
Patented Nov. 23, 1965

3,219,549
DISTILLATION OF DIPHENYLOLALKANES
Walter H. Prahl, Buffalo, and Sol J. Lederman and Ellis I. Lichtblau, Kenmore, N.Y., assignors to Hooker Chemical Corporation, Niagara Falls, N.Y., a corporation of New York
Filed Aug. 31, 1962, Ser. No. 220,617
6 Claims. (Cl. 202—52)

This is a continuation-in-part of our copending application, S.N. 791,281, filed February 5, 1959, now U.S. Patent 3,073,868, issued January 15, 1963.

This invention relates to the distillation of diphenylolalkanes, and more particularly to a process and apparatus therefor.

Diphenylolalkanes are conventionally produced by the condensation of two mols of a phenol with one mol of an aldehyde or a ketone in the presence of an acidic substance. They can be prepared, however, by other methods also, such as, for instance, by the reaction, under the influence of Friedel-Crafts catalysts, of phenol with substances containing triple bonds.

The most common representative of the class of the diphenylolalkanes is 2,2-(4,4'-dihydroxy-diphenyl) propane, frequently called bisphenol-A. It is normally prepared by the reaction of phenol with acetone under the influence of strong acids. Although the present invention is applicable to diphenylolalkanes in general, its application is explained in this specification mainly on the production and purification of bisphenol-A.

The invention is, however, not limited in its application to bisphenol-A. Other gem-diphenylolalkanes, such as those mentioned in Canadian Patent No. 576,491, which are incorporated by reference herein, may also be distilled in accordance with the teaching of this invention.

In the production of diphenylolalkanes in general, and of 2,2-(4,4'-dihydroxy-diphenyl) propane specifically, a number of impurities are formed. Such impurities may comprise, for instance, higher condensation products, containing, for instance, three phenolic nuclei to two radicals of the ketone, and still high condensation products in form of resins and tars, and condensation products having a composition similar to that of the diphenylolalkanes, but having different properties, such as the 2,2(2,4'), and 2,2(2,2') isomers and 2,2,4-trimethyl-4-p-hydroxyphenyl chroman and condensation products of the ketone with itself, and high molecular colored substances, and others.

Numerous processes are known which differ, among others, in the way in which they deal with these impurities.

Some processes do not attempt to separate these impurities at all. Their disadvantage is that all or most of the contaiminants remain in the product, resulting in a bisphenol which contains as much as 20 mol percent impurities, as indicated by the freezing point, and a quantity of colored substances causing a pronounced yellow or brownish color of the product.

It would appear that a distillation of the crude product should result, as it does in many other cases, in a pure product, and this method of purification has been suggested a number of times. In carrying out the distillation, it is obviously easy to remove low boiling contaminants, such as phenol, isopropyl phenol, isopropenyl phenol, etc., as well as the high boiling substances such as the higher condensation products, colored materials, traces of metal, etc. The distillation can be achieved by observing a number of necessary precautions, such as: Insuring the complete absence of acidic or alkaline substances and other materials such as certain salts, which could act as catalysts in the rapid decomposition of bisphenol to resinous matter; employing a very good vacuum; employing the shortest possible holding time in the evaporator; preferably using a thin-surface evaporator, etc. In spite of all these precautions, however, it is practically impossible to avoid a partial decomposition of the bisphenol. The distillate of even the most carefully distilled bisphenol contains certain quantities of the bisphenol isomers of the 2,2,4-trimethyl-4-p-hydroxyphenyl chroman and of similar compounds appearing in the form of a yellow resinous substance, and causing a low freezing point and unsatisfactory color.

Therefore, it is an object of the present invention to produce diphenylolalkanes of a very high degree of purity. A further object of the invention is to provide a simple economical method of purifying crude diphenylolalkanes containing impurities formed as by-products of the reaction. Another object of the invention is to provide a process for the production of diphenylolalkanes having a very high degree of purity at a yield essentially the same as that obtained in producing a crude product containing a considerable percentage of impurities. Another object of the present invention is to distill chemical compounds, under vacuum, at the lowest temperatures commensurate with the vacuum attainable. Another object is to keep to a minimum the time during which the distilling material is subjected to high temperatures. Other objects will become apparent in the course of the description.

In accordance with this invention, heat sensitive gem-diphenylolalkanes are distilled with a minimum of decomposition by the improvement which comprises continuously passing the gem-diphenylolalkane in the form of a body of liquid, whose depth is a minimum consistent with the height of the heat transfer device and whose width is a small fraction of its length, through a heated distillation zone maintained under a high vacuum and at substantially the boiling temperature commensurate with the operating vacuum.

In effecting this improved distillation process, a new and novel vacuum still has also been devised comprising a vacuum chamber having therein a relatively long surface adapted to have passed over it a shallow and narrow stream of liquid gem-diphenylolalkane, the one end of said surface being in communication with vacuum sealed feed inlet means into said chamber, and the other end of said surface being in communication with vacuum sealed residue outlet means from said chamber, said surface being in open communication with vapor removal means in said chamber and in indirect communication with heating means in said chamber, said heating means being adapted to maintain the vacuum chamber at substantially the boiling temperature of the gem-diphenylolalkane commensurate with the operating vacuum.

Figure 2:
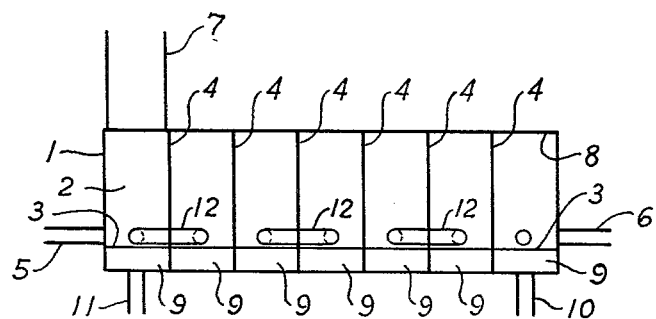

FIGURES 1 and 2 illustrate the principles and one preferred embodiment of the invention. FIGURE 1 shows the top view of a schematic still and FIGURE 2 shows a front view of the same still. The distillation apparatus 1 comprises a vacuum chamber 2 having therein a plane surface 3, with partitions 4 alternately extending from opposite boundaries of said surface 3 to be substantially perpendicular to the overall direction of flow thereby forming a relatively long and narrow surface channel within a relatively small overall dimension of vacuum chamber. The one end of the surface is in communication with vacuum sealed feed inlet means for continuously feeding the gem-diphenylolalkane onto the plane 3 and allowing it to pass through the heated distillation zone formed as the vacuum chamber 2 in the form of a shallow narrow and long liquid stream. The other end of the surface 3 is in communication with vacuum sealed residue outlet means 6 in the chamber, for removing higher boiling residue materials therefrom.

The surface 3 is in open communication with vapor removal means 7 for taking overhead vaporized material, which is later passed to a condenser (not shown), with or without first going through a column, a dephlegmator, or similar means of effecting fractionation.

In the preferred form of our invention, as shown in FIGURE 2, each of the separators 4 extend to the top 8 of the vacuum chamber and is sealed on the top, bottom and one side, and the vapor removal means 7 is at the feed inlet 1 end of the chamber, thereby adapting the vacuum chamber to have the vapors of the material flow countercurrently to the flow of boiling liquid on the surface 3, thus effecting considerable fractionation inside of the chamber.

The surface 3 and vacuum chamber 2 are heated by some convenient heating means such as steam, Dowtherm or the like, in some way such as by passing into the channelled space 9 below the surface 3. The direction of passage can be either co-current or countercurrent to the flow of gem-diphenylolalkane above it. We prefer the flow to be countercurrent, thereby using opening 10 as the heating means inlet and opening 11 as the outlet for the spent heating means.

Alternatively, or, in addition, to the above, as shown in FIGURES 1 and 2, the surface 3 and vacuum chamber 2 are heated by means of a heated conduit means 12, placed within the vacuum chamber 2, itself, adjacent to the surface 3. Again, as in the heating method above, any convenient heating means such as steam, Dowtherm or the like, can be passed into the conduit 12, in any direction of flow relative to the flow on the surface, but with countercurrent flow being preferred, thereby using opening 13 a heating means inlet and opening 14 as the outlet for spent heating means.

The essential principles under which our new technique and apparatus operate are (1) a long narrow and shallow pass, for the material to be distilled, through the apparatus; (2) heat transfer at or through the bottom of such pass; and (3) in the preferred form a countercurrent flow between vapor and liquid.

There are variations which can be incorporated into the apparatus, without departing from the intent of the invention. For example, the apparatus may be constructed in a circular shape so that the partition and surface will form a spiral channel. In this case, the feed liquid may enter at the outside edge and the still residue leave at the center through the bottom.

Still another variation in the apparatus would be to have the surface channel shaped as a vertical cylindrical spiral inside a cylinder, heated either internally or externally, or both.

Still other variations can be made to the apparatus which are readily apparent to one of ordinary skill in this art.

The pressure to be used in the porcess of this invention should be as low as commercially practicable in order to reduce the boiling temperature of the gem-diphenylolalkane to a point where there is a minimum of organic decomposition. This will depend upon the specific gem-diphenylolalkane to be distilled. When distilling 2,2-(4,4'-dihydroxydiphenyl) propane, absolute pressures below about 30 mm./Hg have been satisfactory, with absolute pressures below about 10 mm./Hg being better and absolute pressures of about 1–2 mm./Hg being preferred.

Under certain circumstances, it may be desirable to maintain an equal depth throughout the length of pass by inclining the surface commensurate with the flow of liquid. The depth of the flowing gem-diphenylolalkane along the plane should be close to the minimum required to completely cover the heat transfer device. The maximum depth should be about 12 inches with a preferred range between about ½ to 3 inches. The width of the flowing gem-diphenylolalkane along the plane should be a maximum of $\frac{1}{50}$ of the length of the path.

A preferred embodiment of the invention is to use two novel vacuum stills in series, the first of which distills off lower boiling materials, including phenol, isopropyl phenol, isopropenyl phenol, the 2,2 (2,4') and the 2,2 (2,2') isomers and the 2,2,4-trimethyl-4-p-hydroxyphenyl chroman, while the second distills the 2,2(4,4') isomer off from a residue comprising higher boiling materials.

The following examples will serve to illustrate the use of the apparatus disclosed in this invention.

*Example 1*

In the apparatus of FIGURES 1 and 2, crude 2,2-bis (4-hydroxyphenyl) propane, having a freezing point of 142 degrees, is introduced through inlet 5, while the apparatus is maintained at an absolute pressure of 2 mm. of mercury. Dowtherm at a temperature of 240 degrees enters at 13 and 10. The distillate contains lower boiling impurities, including phenol, and has a freezing point of 113 degrees. The still residue is removed from outlet 6 and is led into another unit of the same construction, heated by Dowtherm at a temperature of 260 degrees. The distillate, consisting essentially of 2,2-bis (4-hydroxyphenyl) propane has a freezing point of 154 degrees, and the residue comprises tars and some undistilled product.

Example 2 shows our preferred method of preparing diphenylolalkanes of unusually high purity by means of distillation of the gem-diphenylolalkane followed by extracting the impurities remaining in the distillate.

*Example 2*

Eighty parts/time of phenol, eight parts/time acetone and 1.2 parts/time of resin recovered by extraction of the product, are continuously saturated with 2.2 parts/time of gaseous hydrogen chloride and continuously fed to the first of three jacketed agitated reactors arranged in series and kept at 50 degrees centigrade. To the reacted material, leaving the third reactor, 130 parts/time of phenol are continuously added with agitation. The mixture is fed to the top of a column, in which essentially all hydrogen chloride, all water and part of the phenol are driven off under vacuum and recovered in a condenser, followed by a scrubbing tower for the absorption of the hydrogen chloride in weak hydrochloric acid. The mixture coming from the bottom of the column is fed through two vacuum columns in series, the first of which continuously distills and recovers the remaining phenol, while the second continuously distills the bisphenol-A and close-boiling impurities. A tarry residue is continuously discharged from the bottom of the second column. The distillate is continuously fed into a trough in which an internally cooled cylinder is rotating. A layer of crude bisphenol-A, having a freezing point of about 156 degrees centigrade, builds up to a thickness of about one-half inch. It is continuously removed by a blade, fed into a grinder, where it is reduced to a size passing through a 10 mesh screen, and fed continuously to an extractor. Here the material is continuously extracted by means of about 50 parts/time of benzene. The benzene containing the extracted impurities is recovered in a continuous atmospheric distillation, leaving about 1.2 parts/time of resin to be recycled to the reactors.

The extracted bisphenol-A is centrifuged and dried in vacuum. Thirty parts/time of bisphenol-A having a freezing point of 156.8+ degrees centigrade and a light transmittance as defined above of 75+ percent, are obtained.

It is to be understood that the invention is not limited to the specific examples which have been offered merely as illustrative and that modifications may be made within the scope of the appended claims without departing from the spirit of the invention.

1. In the purification of crude gem-diphenylolalkane by distillation, the improvement which comprises continuously passing liquid gem-diphenylolalkane through a heated distillation zone maintained under a high vacuum and at substantially the boiling temperature of said gem-diphenylolalkane commensurate with the operating vacuum, forming a long shallow, narrow body of liquid in the distillation zone, said liquid body having a length of at least fifty times its width and a depth within the range of about equal to the width to the minimum required to completely cover the distillation zone, vaporizing gem-diphenylolalkane, fractionally separating gem-diphenylolalkane vapors from other volatilized impurities and recovering a purified gem-diphenylolalkane.

2. The process of claim 1 wherein the volatilized gem-diphenylolalkane is passed and removed countercurrent to the flow of liquid in the distillation zone.

3. The process of claim 1 wherein the vacuum is maintained below 10 millimeters of mercury.

4. The process of claim 1 wherein the maximum depth of the flowing liquid is less than 12 inches.

5. The process of claim 1 wherein the maximum depth of the flowing liquid is between about ½ to 3 inches.

6. In the purification of crude gem-diphenylolalkane by distillation, the improvement which comprises continuously passing liquid gem-diphenylolalkane through a heated distillation zone maintained under a vacuum of less than 10 millimeters of mercury and at substantially the boiling temperature of said gem-diphenylolalkane commensurate with the operating vacuum, forming a long shallow, narrow body of liquid in the distillation zone, said liquid body having a length of at least fifty times its width and a depth of less than the width, said depth being between about ½ and 3 inches, vaporizing gem-diphenylolalkane, fractionally separating gem-diphenylolalkane vapors from other volatilized impurities and recovering a purified gem-diphenylolalkane.

References Cited by the Examiner

UNITED STATES PATENTS

| | | | |
|---|---|---|---|
| 11,207 | 7/1854 | Bulkley | 159—40 |
| 38,152 | 4/1863 | Cook | 159—37 |
| 40,460 | 11/1863 | Darrow | 196—111 XR |
| 85,174 | 12/1868 | Irving | 159—15 X |
| 101,364 | 3/1870 | Hill et al. | 196—111 XR |
| 213,971 | 4/1879 | Brownell | 159—37 |
| 244,983 | 8/1881 | Cutter | 159—40 |
| 284,123 | 8/1883 | Ewins | 159—40 |
| 374,077 | 11/1887 | Mathieu | 202—205 XR |
| 393,196 | 11/1888 | Wheeler | 159—22 |
| 506,752 | 10/1893 | Warner | 159—15 |
| 697,484 | 4/1902 | Hill et al. | 159—37 |
| 877,605 | 1/1908 | Sone | 196—111 XR |
| 986,118 | 3/1911 | Alexander | 159—15 |
| 1,366,642 | 1/1921 | Evans | 196—111 XR |
| 1,451,739 | 4/1923 | Mayes | 196—111 XR |
| 1,774,210 | 8/1930 | Perks | 196—111 XR |
| 1,899,916 | 2/1933 | Payne | 202—52 XR |
| 1,975,563 | 10/1934 | Tijmstra | 196—111 |
| 2,525,025 | 10/1950 | Feil | 202—205 |
| 2,704,742 | 3/1955 | Petrich | 202—173 |
| 2,804,427 | 8/1957 | Suriano | 202—52 XR |
| 2,812,364 | 11/1957 | Farnham et al. | |
| 2,994,645 | 8/1961 | Jones et al. | 202—52 |
| 3,049,569 | 8/1962 | Apel et al. | |
| 3,073,868 | 1/1963 | Prahl et al. | |

FOREIGN PATENTS

| | | |
|---|---|---|
| 671,887 | 12/1929 | France. |
| 905,420 | 4/1945 | France. |
| 16,511 | 7/1902 | Great Britain. |

ROBERT F. BURNETT, *Primary Examiner.*

NORMAN YUDKOFF, *Examiner.*